Sept. 22, 1959     L. J. SPERRY     2,904,845

PLASTIC TUBULAR TRIMMER

Filed Dec. 23, 1954

INVENTOR.
LEONARD J. SPERRY
BY
John W. Michael
ATTORNEY

United States Patent Office 2,904,845
Patented Sept. 22, 1959

2,904,845

PLASTIC TUBULAR TRIMMER

Leonard J. Sperry, Wauwatosa, Wis., assignor to Globe-Union Inc., Milwaukee, Wis., a corporation of Delaware Application December 23, 1954, Serial No. 477,287

2 Claims. (Cl. 18—59)

This invention relates to improvements in capacitors, particularly small, stable, low loss, tubular trimmer capacitors and to the method of making the same.

It has, heretofore, been a problem to provide and maintain an intimate contact between rotor, dielectric and stator in order to minimize unwanted air gap and maintain positive relationship in the presence of vibration and like physical disturbances. This necessitated expensive close tolerance machining which in most instances was still unsatisfactory.

Accordingly, it is a primary object of this invention to provide a small stable tubular trimmer capacitor which is less expensive to make and has: high quality for UHF and VHF applications; good dielectric strength and a consequent low power loss; a high Q at very high frequencies; and successfully resists physical maladjustment and consequent change in capacitance due to vibration or atmospheric humidity.

Another object of this invention is to provide a simple and economic method for making such a tubular trimmer capacitor.

These objects are obtained by providing a capacitor which has both the stator and the rotor moulded in a tubular dielectric member, which provides the support and dielectric for the capacitor and properly grips the rotor. This member, because of its elastic property, has a constant dag on the rotor providing a continual lock in the smallest increments of adjustment. The close fit between such member and the stator and rotor eliminates air gap and thus increases the capacitor rating. The plastic material is injection moulded or cast into the mould cavity in which is supported the stator and a threaded rotor. When set, it forms a solid support body for the entire trimmer holding the stator rigid and elastically gripping the rotor so that it may be adjusted and maintained in adjusted position.

The novel features which are considered characteristic of the invention are set forth with particularity in the appended claims. The invention itself, however, both as to its organization and its methods of operation together with additional objects and advantages thereof will best be understood from the following description of a specific embodiment when read in connection with the accompanying drawing, in which:

Figure 1:
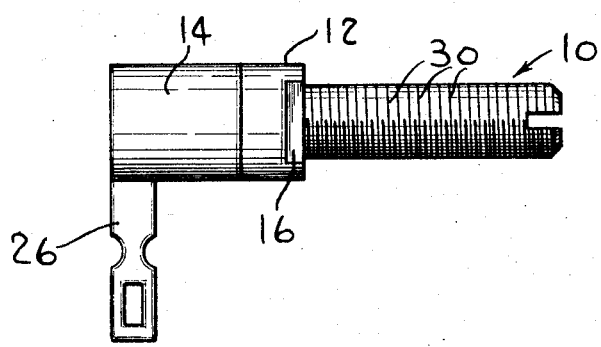
Fig. 1 is a view in side elevation of a capacitor embodying the present invention.
Figure 2:
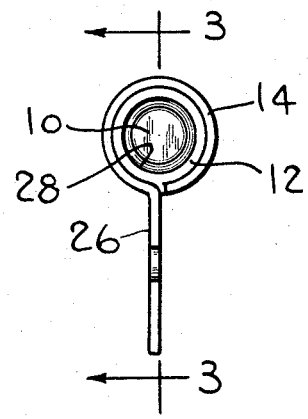
Fig. 2 is a left end view of such capacitor.
Figure 3:
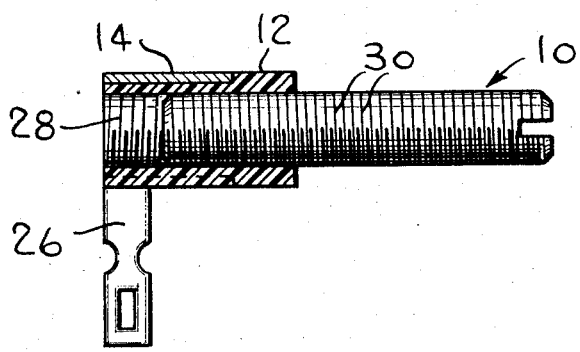
Fig. 3 is a sectional view taken on the line 3—3 of Fig. 2.
Figure 4:
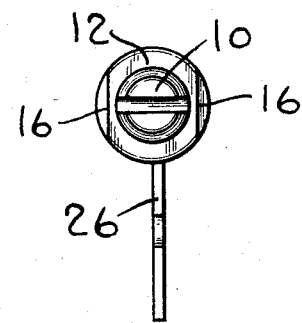
Fig. 4 is a right end view of such capacitor.
Figure 5:
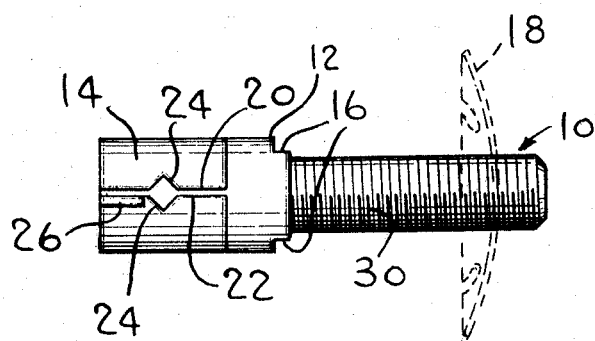
Fig. 5 is a view in side elevation of such capacitor as rotated 90° from the position shown in Fig. 1.

The tubular trimmer capacitor shown in the drawing consists of three parts: a headless screw forming the rotor 10, a dielectric body 12 and a rolled stator 14. The capacitor may be mounted to a chassis by inserting flats 16 on the right end of the body in oblong holes in the chassis and threading a speed nut 18 (see Fig. 5) on the rotor 10 tightly against the chassis. This nut makes the electrical connection for the rotor 10.

The stator 14 is a stamping rolled into hollow cylindrical shape so that its facing edges 20 and 22 are slightly spaced. Both of these edges have V-shaped notches 24 cooperating to form a diamond-shaped hole. A terminal 26 integral with and projecting from the edge 22 is made flat to insure low inductance at higher frequencies.

The dielectric body 12 is made of plastic material such as polyethylene, polytetrafluoroethylene or plasticized polystyrene, into which both the stator 14 and rotor 10 are moulded. Such material, when set, has mechanical qualities such as elasticity, resilience, friction, mold shrinkage, and hardness accompanied by good electrical characteristics such as low power loss and high Q at very high frequencies. The outer surface of both stator 14 and dielectric body 12 are of the same diameter and part of the dielectric body 12 is moulded in between the edges 20 and 22 and into the diamond-shaped opening formed by the notches 24. This provides a tight lock between stator 14 and dielectric member 12. The dielectric body 12 also has an internal thread 28 which is formed by forcing or flowing the plastic material into the threads 30 on the rotor 10. As the plastic material cools or cures, it shrinks to give a snug fit around the threads 30 on the rotor 10 eliminating the air gap between such material and rotor and setting up sufficient frictional resistance to require relative high torque to rotate the screw. However, because of the resilience and low coefficient of friction of such material the screw may be turned smoothly without binding and chattering. The rotation between rotor 10 and dielectric body 12 takes place within the elastic limits of the plastic and thus maintains a snug fit.

Referring more particularly to the manufacturing process, both the stator 14 and rotor 10 are placed in a moulding cavity. The outer diameter of the stator 14 is the same as the inner diameter of the mould, thus the mould offers a tight support to the stator in the moulding process. The rotor 10 which is substantially longer than the stator 14 and the mould is supported on the longitudinal center line of the mould cavity extending from end to end thereof. The plastic material is injection moulded at temperatures of 375° to 400° F., approximately, into the mould cavity by being introduced in accordance with techniques well known in the moulding art. A cylindrical dielectric body 12 is thus formed which fills the space between the stator 14 and rotor 10 so completely that any interposed air or other fluid is excluded. Due to its natural resiliency, the plastic tightly encompasses the rotor 10 and exerts a continual tension on it. Such tension eliminates changes in position which would be caused by vibration, time or humidity and provides an exact conformity with the screw thread enabling an easy rotative variation.

Although only one embodiment of the invention is shown and described herein, it will be understood that this application is intended to cover such changes or modifications as come within the spirit of the invention or scope of the following claims.

I claim:

1. A method of making a tubular trimmer capacitor which comprises: arranging a tubular stator spacedly around a threaded rotor supported on the center line of said tubular electrode; moulding a plastic dielectric material having cold flow properties and shrinkage upon cooling from liquid to solid state into the space between said stator and rotor; and permitting said material to set and shrink to form a dielectric and support for the capacitor which has an elastic threaded engagement with said rotor.

2. A method of making a tubular trimmer capacitor which comprises: providing a mould cavity; assembling a tubular stator with a side opening and threaded rotor within a mould cavity with the outer surface of said stator resting against the inner surface of said mould and said threaded rotor supported on the center line of said stator; moulding plastic dielectric material into said cavity between said stator and rotor and into said side opening; and permitting said material to set and shrink to form a dielectric and support for said capacitor which has threads elastically engaging said rotor.

References Cited in the file of this patent

UNITED STATES PATENTS

| | | |
|---|---|---|
| 2,516,981 | Hall | Aug. 1, 1950 |
| 2,595,194 | Heibel | Apr. 29, 1952 |
| 2,688,177 | Wagner | Sept. 7, 1954 |
| 2,713,144 | Montllor | July 12, 1955 |
| 2,757,346 | Lahaye | July 31, 1956 |

FOREIGN PATENTS

| | | |
|---|---|---|
| 524,434 | Great Britain | Aug. 6, 1940 |
| 918,056 | France | Oct. 7, 1946 |
| 710,444 | Great Britain | June 9, 1954 |